United States Patent
Färber

(10) Patent No.: US 6,270,154 B1
(45) Date of Patent: Aug. 7, 2001

(54) MOTOR VEHICLE ROOF WITH AT LEAST TWO RAISABLE AND MOVABLE RIGID COVER ELEMENTS

(75) Inventor: Manfred Färber, Wielenbach (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/579,130

(22) Filed: May 30, 2000

(30) Foreign Application Priority Data

May 29, 1999 (DE) .............................................. 199 24 792

(51) Int. Cl.[7] ..................................................... B60J 7/047
(52) U.S. Cl. ................ 296/213; 296/220.01; 296/216.09
(58) Field of Search .......................... 296/216.06–216.09, 296/220.01, 213

(56) References Cited

U.S. PATENT DOCUMENTS 5,727,839 * 3/1998 Ruhringer et al. .................... 296/213
5,961,177 * 10/1998 Caye et al. ............................ 296/213

FOREIGN PATENT DOCUMENTS 0 571 890  4/1995 (EP) .
2 259 284  3/1993 (GB) .

* cited by examiner

Primary Examiner—Dennis H. Pedder
(74) Attorney, Agent, or Firm—Nixon Peabody LLP; David S. Safran

(57) ABSTRACT

A motor vehicle roof has at least two raisable cover elements for selective closing or at least partially exposing a roof opening in a fixed roof surface, with gutters which run laterally lengthwise along the roof opening, a bead-shaped seal which is located transversely in the direction of travel on the front edge of the cover element and which with the roof closed fills and seals the gap between adjacent cover elements, a first primary gutter which is located in front of the bead-shaped seal, and a secondary gutter which is located in front of the primary gutter such that two gutters arranged in a cascade are formed, the end sides of the primary and secondary gutter being located over the gutters which run laterally along the roof opening in order to drain off the water which is located on the cover element with the cover element raised.

15 Claims, 4 Drawing Sheets

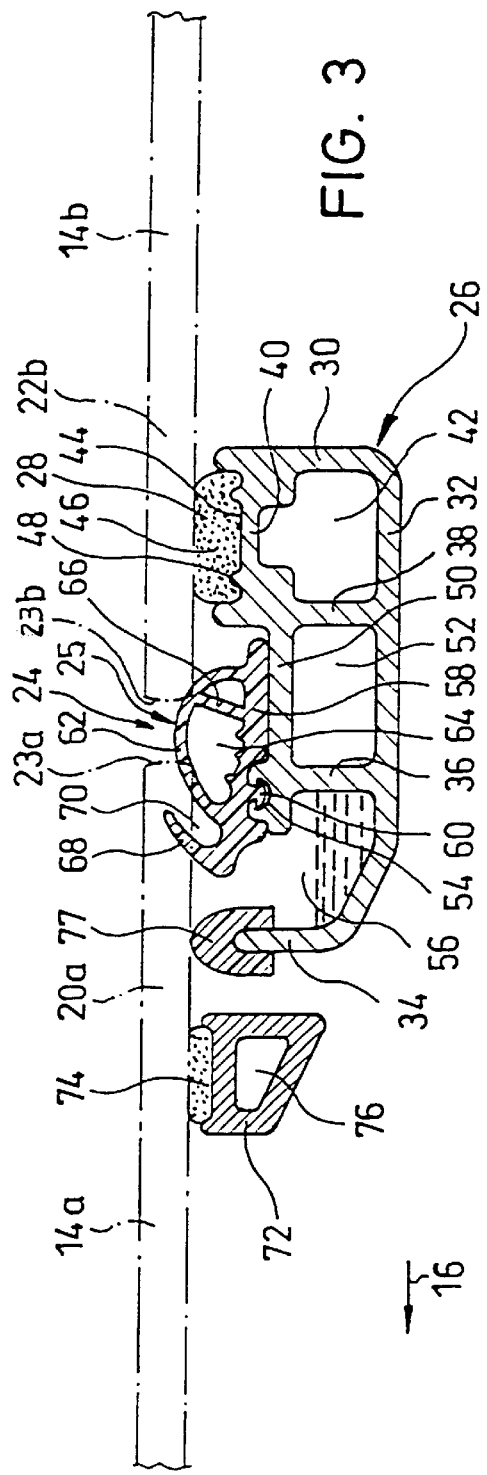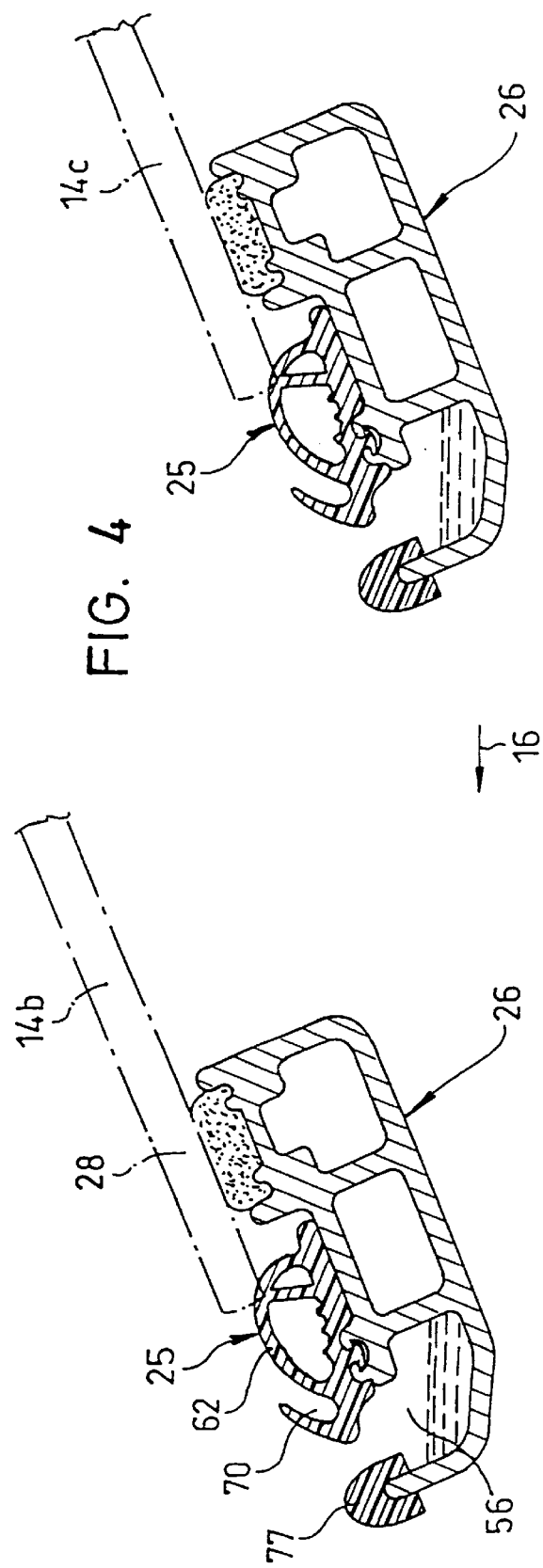

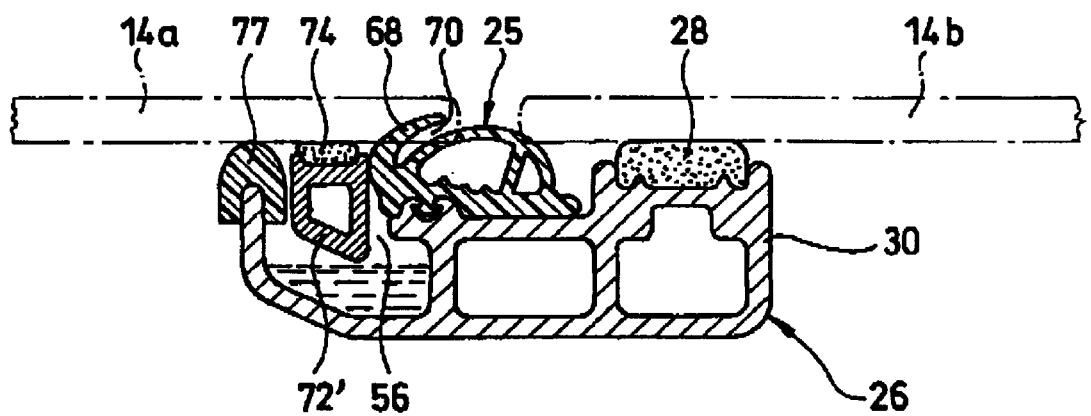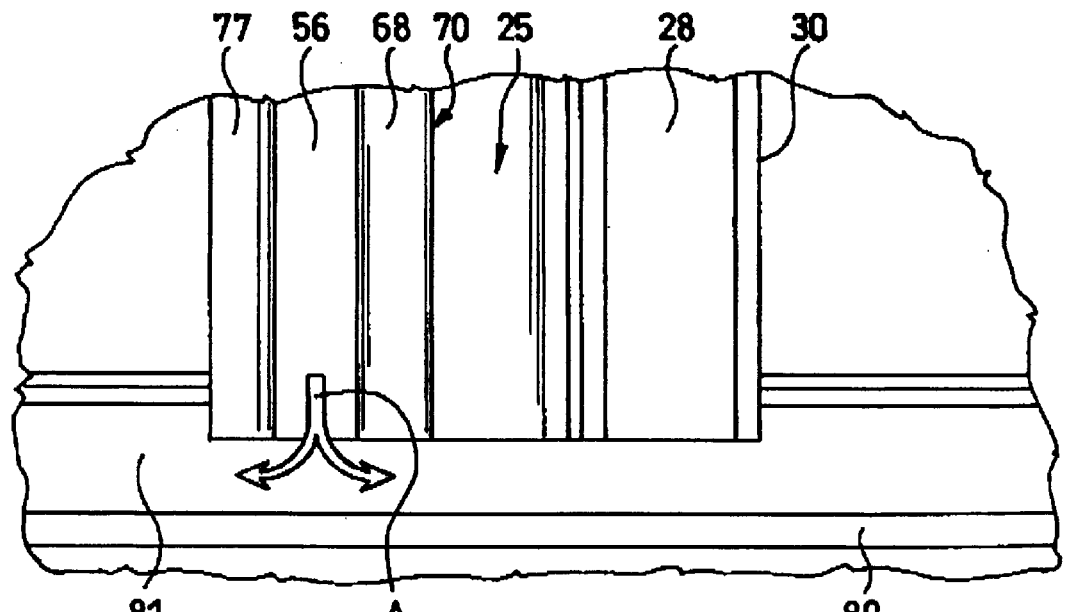

MOTOR VEHICLE ROOF WITH AT LEAST TWO RAISABLE AND MOVABLE RIGID COVER ELEMENTS

BACKGROUND OF THE INVENTION

1. Field of the Invention

The invention relates to a motor vehicle roof with at least two raisable and movable rigid cover elements for selective closing or at least partial clearance of a roof opening with gutters which run laterally along the roof opening.

2. Description of Related Art

Motor vehicle roofs of the initially mentioned type can be, for example, multi-cover roofs or louvered roofs, and are subject to the problem that water which has collected on the roof surface when the roof is closed or partially closed, runs between the individual cover elements and penetrates into the vehicle interior when the roof is opened.

Various roof structures have been proposed in which this problem was considered, but the roof structures known to date are all subject to disadvantages.

For example, German Patent DE 197 56 021 C1 discloses a motor vehicle roof which has several covers, in which the front end of the cover element in the direction of forward vehicle travel has a bead-shaped seal for sealing of the gap between the two adjacent cover elements. In front of the seal, there is a lip which is pointed upward in order to form a gutter when the roof is in the opened state. However, since this gutter is not large enough to drain the water on the cover elements into the gutters which are arranged laterally along the vehicle when the roof is being opened, underneath the cover arrangement there is a headliner which is impermeable to water and which, when the roof is opening, forms undulations with which the water shooting over the gutter of the seal is routed into the laterally running gutters. In this approach, however, it is a disadvantage that there are limitations in the choice and in the configuration of the headliner. Furthermore, the headliner has become an essential component of such a roof structure which cannot be replaced by blinds or a movable plate headliner in a roof structure for transparent cover elements.

European Patent 0571890 discloses an embodiment with a roof structure having of a host of cover elements, the cover elements being composed of extruded elements. With the roof closed, a gap is formed between the adjacent cover elements; in the direction of forward vehicle travel, in front of this gap, there is a seal which together with the gap forms a gutter, and in front of the seal there is a front gutter which is formed in one piece with the cover element. The disadvantage in this arrangement is that the gutter formed by the gap and the seal is continually opened to the outside, and thus, under certain circumstances, is already filled with water so that, when the roof is opened, this gap or this gutter can no longer hold water and all the water flowing off the cover element must be accommodated by the front gutter which then can no longer drain water into the side gutters, so that water can reach the vehicle interior. Furthermore, over time, the gap can be filled with dirt, such as leaves or the like, so that water can no longer flow out via the gap. In addition, the gap can lead to significant wind noise when the vehicle is being driven.

Published UK Patent Application GB 2 259 284 discloses a roof arrangement which is basically similar to the roof of European Patent 0571890.

German Patent 44 43 525 discloses a roof formed of louvers which have, in the joint area between bordering louvers, an elastic seal on a water drain of the back louver element. An elastically flexible section is molded on in one piece to the seal and can move by a butt edge of the movable front roof louver, depending on the opening and closing motion of this roof louver, between a relieved rest position which is raised up and which forms surge water protection, and a loading position which fills the gap between the adjacent louver elements and which tightly overlaps the water drain. In the direction of travel, above the movable sealing section, there is an additional, somewhat smaller gutter on the sealing arrangement.

The disadvantage in this arrangement is that the movable sealing section can adhere to the back roof louver when the roof arrangement is kept closed for a long time, or over time it loses elastic pretension and then no longer executes its motion upward to clear the surge water gutter, so that all the water on the louver element must be accommodated by the additional smaller gutter and must be drained off laterally. In this case, the additional small gutter is overtaxed with the drainage of water so that water can penetrate into the vehicle interior.

SUMMARY OF THE INVENTION

Therefore, a primary object of this invention is to devise a vehicle roof of the initially mentioned type in which penetration of water between the cover elements is effectively prevented.

This object is achieved by a vehicle roof with at least two raisable cover elements for selective closing or at least partial exposing a roof opening, with gutters which run laterally lengthwise along the roof opening, a bead-shaped seal which is located transversely in the direction of travel on the front edge of the cover element and which, with the roof closed fills and seals the gap between adjacent cover elements, a primary gutter which is located in front of the bead-shaped seal, and a second gutter which is located in front of the primary gutter, so that two gutters arranged in a cascade are formed, the end sides of the primary and secondary gutter being located over the gutters which run laterally along the roof opening in order to drain off the water which is located on the cover element with the cover elements raised.

This overall arrangement makes it possible to successfully prevent penetration of water which is located on the cover element, and the need a water-carrying headliner eliminated. The bead-shaped seal which is located in the gap between the cover elements prevents penetration of water in the closed state of the roof, generation of wind noise being suppressed. When the roof is being opened or with the roof open the primary gutter prevents penetration of water by the water which is running off the cover element being drained to the lateral gutters via the primary gutter. For the case in which a large amount of water which can no longer be managed via the primary gutter is to be drained, there is an additional secondary gutter, by which the penetration of water into the vehicle interior can be prevented under all conditions.

Advantageously the secondary gutter can be made as a U-shaped rail which is attached via an adhesive connection on the lower front side of the cover element. In this way, the rail is used not only as the drain gutter, but also to stiffen the cover element, especially when the cover element is a transparent pane of glass or plastic. Furthermore, the rail can be used to easily accommodate the bead-shaped seal without the need to provide additional attachment means for the seal.

Furthermore, there can be a primary gutter that is formed as a lip which is made in one piece with the bead-shaped seal, and which, with the roof closed, presses against the rear of the underside of the front adjacent cover element and thus advantageously represents an additional seal.

On the rear underside of the front adjacent cover element, a strip which extends in the width direction can be attached via an adhesive connection, and it is used as further stiffening of the cover element. When the strip is arranged such that, with the roof closed, the strip is held by the U-shaped rail, this interfitting arrangement of the rail and strip is used as intruder protection, since with pressure from above, the roof the rail and the strip are wedged into one another.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 3 shows a partial sectional view of the area at which two cover elements of the motor vehicle roof adjoin each other in the closed position;

FIG. 4 shows a partial sectional view of the forward edge area of two panel elements of the motor vehicle roof in the opened position;

FIG. 7 is a cross-sectional view corresponding to that of FIG. 3, but showing a modified arrangement of the cover stiffening strip; and FIG. 8 is a partial plan view of the left end area of gutter arrangement showing the drainage flow.

DETAILED DESCRIPTION OF THE INVENTION

Figure 1:
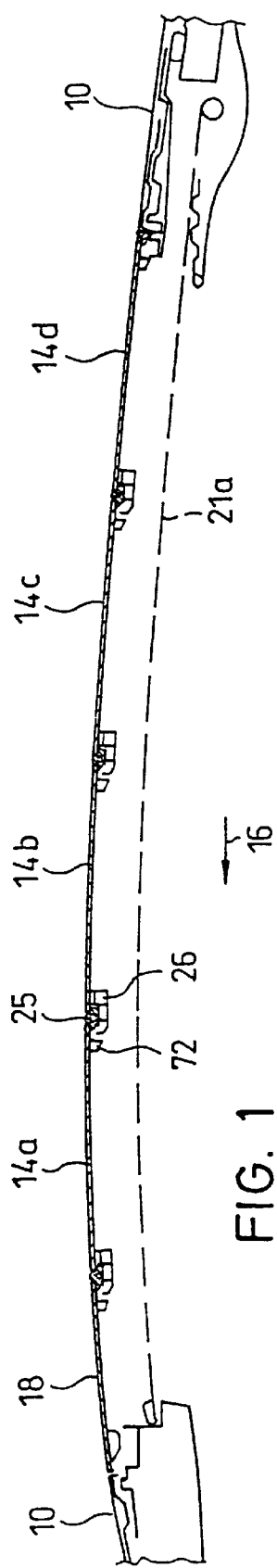
FIG. 1 shows a sectional view of a motor vehicle roof in accordance with the invention in the closed position.
Figure 2:
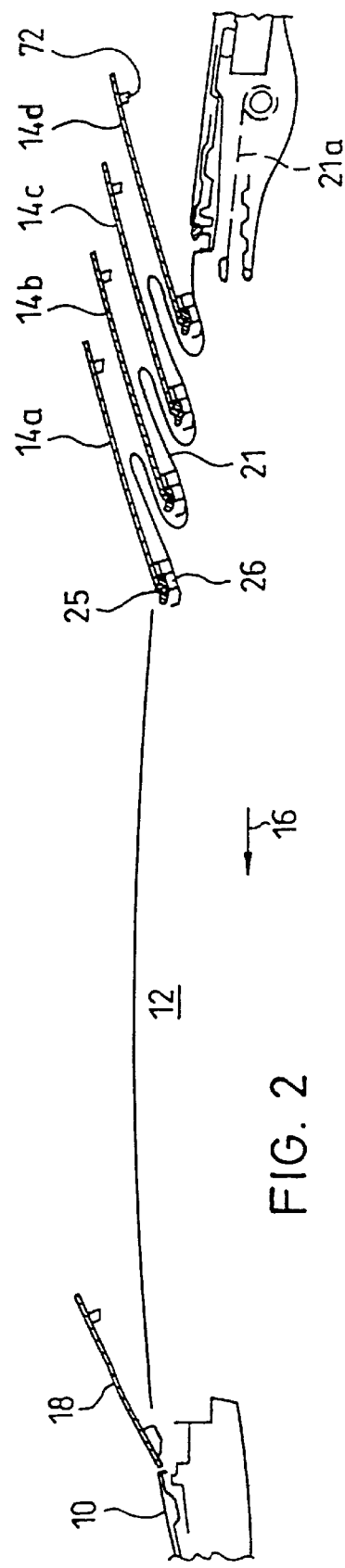
FIG. 2 shows a sectional view of the motor vehicle roof of FIG. 1 in the opened position.

As shown in FIGS. 1 and 2, in the fixed roof surface 10 of a motor vehicle, there is a roof opening 12 which can be selectively closed (see FIG. 1) or are at least partially exposed (see FIG. 2) by means of raisable cover elements 14a to 14d which can be moved in the lengthwise direction of the vehicle and which are guided in guide rails 80 (shown in FIG. 8) which run laterally along the sides of the roof opening. In the lengthwise direction of the vehicle, on both sides of the roof opening 12, there are lateral gutters 81 (shown in FIG. 8). These lateral gutters 80 can be formed by a part of the profile of the guide rails 81.

In the direction of travel 16, on the front end of the roof opening 12, there is a swingable, plate-like wind deflector 18 which extends transversely to the direction of travel and which is coupled to the front transverse edge of the roof opening 12. In the closed state of the roof arrangement, the fixed roof surface 10, the wind deflector 18, and the cover elements form a surface which arches both forward and backward and also laterally slightly downward. In an opened roof arrangement, the wind deflector swings up and the rear end sections 20a to 20d of the cover elements 14a to 14d project over the fixed roof surface 10, their front end sections 22a to 22d being arranged sloping downward in an obliquely forward direction. Here, the front end sections 22a to 22d of the cover elements 14a to 14d are roughly flush with the roof opening 12. On the inside of the vehicle, therefore, underneath the cover elements 14a to 14d, there is a foldable head liner 21 which folds into the intermediate spaces between the raised cover elements 14a to 14d with the roof opened.

FIGS. 3 and 4 show a detailed sectional view of the roof arrangement in the closed (FIG. 3) and in the opened state (FIG. 4). As shown in FIG. 3, in the closed state, the rear end section 20a of the front cover element 14a and the front end section 22b of the rearwardly adjoining cover element 14b abut one another with the formation of a gap 24 which runs transversely to the direction 16 of vehicle travel. Underneath the gap 24, there is a bead-shaped seal 25 which partially fills the gap 24 and in doing so seals it. The seal 25 is, in turn, held by a rail 26 which is located underneath the cover elements 14a to 14d. The cover elements 14a to 14d are made essentially as thin rectangular plates which are produced from tinted or untinted glass or plastic.

On the bottom of the front end section 22b of the back cover element 14b, i.e., on the inside of the vehicle, the rail 26 is joined to the front edge area of the cover element 14b via an adhesive connection 28. The rail 26 is located transversely to the direction of travel and parallel to the rear end edge 23a of the front cover element 14a and to the front end edge 23b of the back cover element 14b. Viewed in the direction of travel the rail 26 is extended in width so that the rail overlaps the back end section 20a of the cover element 14a and the front end section 22b of the front cover element 14b.

As shown in FIG. 3, the rail 26 is produced as an extrusion, preferably from an aluminum material. Viewed in cross section, the rail 26 has a vertically arranged back wall 30, a horizontally arranged lower wall 32 and a vertically arranged front wall 34. The back wall 30, the lower wall 32 and the front wall 34 form a U-shape. In the middle section of the rail 26, there are a vertically arranged front bridge wall 36 and a vertically arranged back bridge wall 38. The two bridge walls 36 and 38 divide the space of the rail 26 surrounded by the U-shape into roughly three sections of the same size. Between the back wall 30 and the back bridge wall 38, there is a back ceiling wall 40 so that a back cavity 42 is formed. The back wall 30 and the back bridge wall 38 project roughly above and beyond the back ceiling wall 40 in order to form a U-shaped basin 44 for holding a strand 46 of adhesive. On the top of the back ceiling wall 40, nub-like bridges (extensions 48) are formed which run lengthwise and which are used for better adhesion of the adhesive 46. Between the back bridge wall 38 and the front bridge wall 36 there is a front ceiling wall 50 so that the front cavity 52 is surrounded. In the front ceiling wall 50, a retaining groove 54, which is C-shaped in cross section and which is upwardly open, is formed roughly in a flange-like extension of the front bridge wall 36. The front wall 34, the back wall 32 and the front bridge wall 36 are upwardly open in order to form a U-shaped secondary gutter 56 which ends on the lateral sides over the lateral gutters 81 of the roof opening so that water can be drained from the U-shaped secondary gutter 56 into the lateral gutters 81.

The bead-shaped seal 25, which is made from elastically deformable rubber material, is supported on the front ceiling wall 50. The seal 25, which is shown in the drawing in the undeformed, relieved form viewed in cross section, has a bottom wall 58 on which an extension 60, which is mushroom-shaped in cross section, is formed on the middle section. The extension 60 is made to fit the C-shaped retaining groove 54 of the rail 26. Proceeding from the bottom wall 58, there extends upward a semicircular bead-shaped wall 62 which encloses a cavity 64. In the section of the cavity 64 which is the back section in the direction 16 of forward vehicle travel, a vertically arranged bridge 66 is formed for stiffening the bead-shaped wall 62. The bottom wall 58 is elongated forward (arrow 16) beyond the bead-shaped wall 62, a lip 68 on the front face extending upward and being inclined somewhat to the rear. Between the lip 68 and the bead-shaped wall 62, a primary gutter 70 is thus formed.

The mushroom-shaped extension 60 of the seal 25 is inserted into the C-shaped retaining groove 54 of the rail; in doing so, with the roof closed, the bead-shaped wall 62 is pressed against the front end side 31b of the back cover element 14b and against the back end side 23a of the front cover element 14a, so that the gap 24 is at least partially filled, and thus, is sealed relative to the outside. With the roof closed, the lip 68 is pressed against the bottom of the rear section 20a of the front cover element 14a in order to form an additional seal. When the roof is being opened or the roof is open, the primary gutter 70 formed between the lip 68 and the bead-shaped wall 62 captures the water running from the rearwardly adjoining cover element 14b and drains the water into the lateral gutter 81 on the guide rail 80. For the case in which a strong water surge runs over the back cover element 14b (see FIG. 4), the primary gutter 56 being flooded, the water which runs over the primary gutter 70 is captured by the secondary gutter 56 on the rail 26, located underneath and in front of the primary gutter 70, and like the primary gutter 70, the secondary gutter 56 drains into the gutters which run laterally along the roof opening 12. Thus, under all circumstances it is ensured that water cannot penetrate into the vehicle interior.

On the rear end section 20a of the front cover element 14a, a strip 72 is attached by an adhesive connection 74 on the bottom of the cover element 14, the strip 72 being aligned parallel and adjacent to the front wall 34 of the rail 26 with the roof closed. The strip 72 is made as an extrusion which is preferably produced from an aluminum material. The strip 72 has a hollow section 76 which is made essentially as a square with a sloping bottom wall and is used to stiffen the rear section 20a of the front cover element 14a.

Viewed in cross section, the outside contour of the strip 72 and the outside contour of the rail 26 are made complementary to one another so that the strip 72 and the rail 26 optically form a unit due to the sloping bottom wall of the strip 72 matching the adjoining angled corner of the front wall 34 of the rail 26.

Very stiff profiles of stable shape which are used to easily stiffen the cover element 14a to 14d are made available by the cavities 42 and 52 which are formed both in the rail 26 and also by the cavity which is formed in the strip 72.

Alternatively, as shown in FIG. 7, the strip 72' can also be arranged such that, with the roof closed, the strip 72' comes to rest in the secondary gutter 56 of the rail 26. In this arrangement, an additional contribution to intruder protection is provided since, upon the imposition of an external force on the roof, the secondary gutter 56 and the strip 72' hook one another and thus make it difficult to break into the vehicle via the roof.

The arrangement was described above, by way of example, on a connecting joint of two bordering cover elements 14a and 14b. It goes without saying that this type of connection can also be used for other connecting joints between two cover elements 14a to 14d and also in matched form to the connecting joint of the frontmost cover element 14a with the front edge of the roof opening 12 and to the connecting joint of the rearmost cover element 14d with the rear edge of the roof opening 12.

By means of the above described roof arrangement, the configuration of the headliner 21 is optional since it need not perform any water-carrying tasks, so that, on the one hand, the headliner 21 can be completely eliminated, or instead of the headliner, a shade (not shown) or a liner which is made of plates (not shown) which move into one another can be used.

Instead of producing the cover elements 14a to 14d from a glass plate, they can also be produced from a bent sheet or the like.

Figure 5:
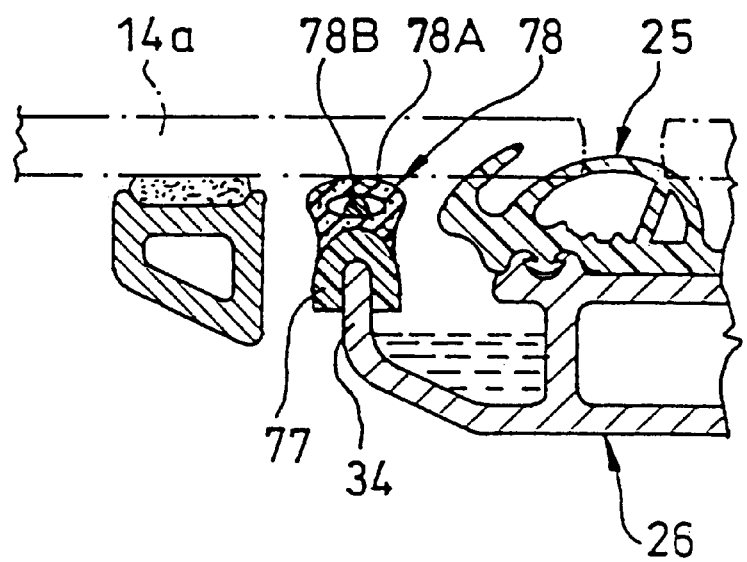
FIG. 5 shows a partial sectional view corresponding to that of FIG. 3, but with a modified seal arrangement.
Figure 6:
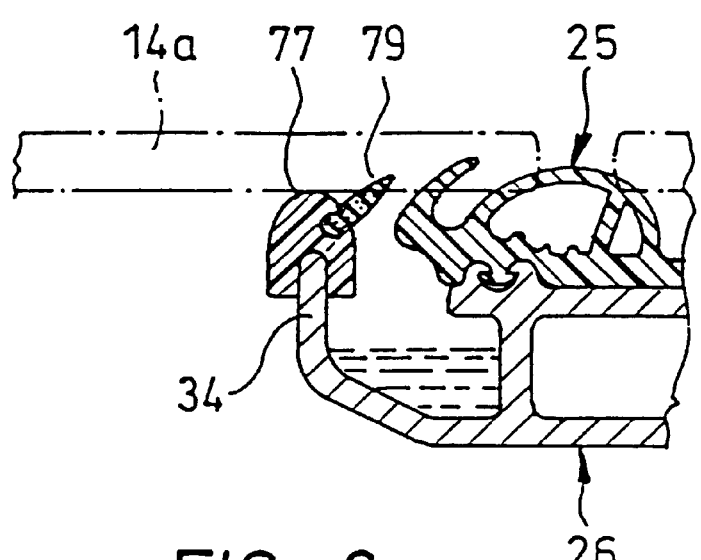
FIG. 6 shows a partial sectional view corresponding to that of FIG. 3, but with another modified seal arrangement.

As is shown in FIGS. 3, 5 & 6 in different versions, it is advantageous if the top edge of the front wall 34 of the secondary gutter 56 rests against the bottom of the respective cover element 14a to 14d which lies forward of it. By pressing against them, differences in camber on the cover elements can be equalized in a defined manner. On the other hand, by fitting an elastic sealing section 77 onto the top edge of the front wall 34, an additional sealing of the secondary gutter 56 to the front can be produced.

In FIG. 3, a sealing section 77 with only limited elasticity presses with its top edge against the bottom of the cover element 14a. In doing so, a contour which is dictated by the shape of the sealing section 77 is impressed on the camber of this cover element 14a in the area of its rear edge.

In the version shown in FIG. 5, the sealing profile 77 presses against a seal 78 which is attached on the bottom of the cover element 14a. The seal 78 is composed of an elastically deformable hollow chamber part 78A and an inner lip 78B which is located within the hollow chamber part and which is made relatively hard as compared to the material of the hollow chamber part 78A. Here, the deforming hollow chamber part 78A is used to seal the secondary gutter 56 toward the front; when the hollow chamber part 78A has been deformed and the inner rib 78B adjoins the upper wall of the hollow chamber part 78A, the sealing profile 77 can, in turn, by pressing against it, determine the contour of the cover element 14a with respect to its camber.

In FIG. 6, another version is shown in which the sealing profile 77 is formed from a relatively stiff material of only limited elasticity. It presses directly against the bottom of the cover element 14A and impress a corresponding arched contour on it. On the sealing profile, there is additionally a sealing lip 79 which adjoins the bottom of the cover element 14a and in doing so causes soft sealing of the secondary gutter 56 toward the front.

The above described additional sealing of the secondary gutter 56 relative to the cover element 14a which lies in front also improves the noise damping of the interior to wind noise, especially in motor vehicles which are suited for high speeds.

As is shown in FIG. 8, the transversely running primary and secondary gutters 70, 56 end laterally over the gutters 81 which run lengthwise, and according to the arrows A in FIG. 8, deliver the captured water to the gutters 81. The front and rear ends of gutters 81 are connected in a conventional manner to water drain hoses via which the water is drained down through the A-column and C-column of the vehicle body.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Vehicle roof comprising at least two raisable, adjacent cover elements for selective closing or at least partially exposing a roof opening in a fixed roof surface having gutters which run laterally lengthwise along the roof opening, a bead-shaped seal located, extending transversely relative to a forward direction vehicle travel, on a front end of a one of the cover elements which is located behind the other of the cover elements relative to said direction of travel, the bead-shaped seal filling and sealing a gap between the adjacent cover elements in a closed position of the elements, a first, primary gutter which is located forward of the bead-shaped seal, and a secondary gutter which is located in front of the primary gutter, the primary and secondary gutters being positioned in a cascade arrangement and having lateral ends located over lateral gutters which run lengthwise along lateral sides of the roof opening in order to drain off water which is located on the cover elements with the cover elements raised.

2. Motor vehicle roof as claimed in claim 1, wherein the primary gutter is formed in one piece with the bead-shaped seal.

3. Motor vehicle roof as claimed in claim 1, wherein the secondary gutter is a U-shaped rail.

4. Motor vehicle roof as claimed in claim 3, wherein the rail has an attachment section via which the rail is connected to a front end section of a bottom side of the cover element.

5. Motor vehicle roof as claimed in claim 4, wherein the connection between the attachment section and the bottom of the cover element is a cement connection.

6. Motor vehicle roof as claimed in claim 3, wherein the bead-shaped seal is attached on the U-shaped rail.

7. Motor vehicle roof as claimed in claim 1, wherein the primary gutter is located between an elastic lip which projects up and to the rear from a front edge area of the bead-shaped seal and a bead-shaped wall of the bead-shaped seal.

8. Motor vehicle roof as claimed in claim 7, wherein the lip, with the roof closed, adjoins a bottom side of a rear section of forward one of the adjacent cover elements.

9. Motor vehicle roof as claimed in claim 3, further comprising a strip which is attached by means of a cement connection on a bottom side of a rear section of a front one of the adjacent cover elements.

10. Motor vehicle roof as claimed in claim 9, wherein the strip is located in the secondary gutter with the roof closed.

11. Motor vehicle roof as claimed in claim 1, wherein a top edge of a front wall of the secondary gutter presses against the bottom of a forward one of the adjacent cover elements.

12. Motor vehicle roof as claimed in claim 11, wherein a sealing section of limited elasticity is located on the front top edge of the secondary gutter.

13. Motor vehicle roof as claimed in claim 12, wherein the sealing section presses against a seal on a bottom side of the cover element.

14. Motor vehicle roof as claimed in claim 12, wherein an additional sealing lip adjoins a bottom side of the cover element on the sealing section.

15. Motor vehicle roof as claimed in claim 11, wherein the pressure of the top edge of the front wall impresses a defined camber on the cover element in an area of the back edge thereof.

* * * * *